United States Patent [19]

Skelly

[11] Patent Number: 4,726,058
[45] Date of Patent: Feb. 16, 1988

[54] TELEPHONE CONVERSION DEVICE

[75] Inventor: Peter T. Skelly, Kirkland, Wash.

[73] Assignee: Telemart Communications Corporation, Redmond, Wash.

[21] Appl. No.: 926,898

[22] Filed: Nov. 3, 1986

[51] Int. Cl.[4] .............................................. H04M 1/00
[52] U.S. Cl. .................................................... 379/163
[58] Field of Search ............... 379/163, 156, 157, 164, 379/441, 442

[56] References Cited

U.S. PATENT DOCUMENTS 4,338,495 7/1982 Bloch et al. ........................ 379/164

OTHER PUBLICATIONS

Comdial—Business Communications Division, Modular Ten-Button Keystrip Voice Expres 41—Installation Instructions IMI 89-005, Jan. 1985. Comdial—Business Communications Division, Modular Six-Button Keystrip Voice Express 41—Installation Instructions IMI 89-002 Aug. 1984. Tele-Tender Key-System Adapter with built in Ringer. TT Systems Corporation, New York, New York.

*Primary Examiner*—Stafford D. Schreyer
*Attorney, Agent, or Firm*—Seed and Berry

[57] ABSTRACT

A telephone conversion device for converting a multiple line electromechanical telephone system having an electromechanical key system unit (KSU) for use with electronic telephones. Each conversion device includes a wall unit having a 50-pin connector for mating with the 50-pin connector of the KSU outlet cable, and a keystrip unit positionable on the desk of the user and upon which an electronic telephone is positioned. A slender 8-wire cord extends between the keystrip and wall units. The wall unit includes a first microprocessor which operates with a line status detector for determining the operational status of five multiple telephone lines by sensing the lamp driving signals provided by the KSU. Relays under the operation of the first microprocessor connect a selected line to a common talking pair which extends within the cord between the units for connection to the telephone. A detector detects when the receiver is off-hook. The keystrip unit includes a second microprocessor which operates with a switch scanning detector to sense the operation of five momentary contact line selection switches, each corresponding to one of the lines, and a momentary contact hold switch. Five pair of line status lights are provided, one pair being positioned adjacent to each of the line selection switches and selectively emitting red or green color light. Based upon information from the detectors the microprocessors control operation of the status lights and the relays. The first microprocessor maintains a hold-queue indicating which of the lines have been put on hold by the user and the order the lines were put on hold, and can automatically select a line for connection from the hold-queue or an idle line. The light color and whether constant or flashing indicates if the line is under the user's or another's control, and whether on hold or in use.

34 Claims, 9 Drawing Figures

TELEPHONE CONVERSION DEVICE

TECHNICAL FIELD

The present invention relates generally to electromechanical telephone systems operating under the 1A2 standard, and more particularly, to a device for converting such an electromechanical system for use with full feature electronic telephones.

BACKGROUND OF THE INVENTION

The worldwide telephone system presently existing, which has taken over 100 years to develop and build, is based upon single-line and multiple-line standards adopted by all countries. The multiple-line telephone systems are under a standard called "1A2". This standard has been complied with by most commercial, institutional and governmental users where multiple-line telephnes were required.

The 1A2 standard was originally developed utilizing electromechanical (i.e., analog) technology. This is still the predominant technology used in existing installations. However, in recent years many telephone systems have been installed using the newer electronic (i.e., digital) technology. The key difference between the 1A2 systems and the electronic systems is that the 1A2 system uses electromechanical components and large diameter 25-wire pair cables (50-wires), while the electronic system uses digital circuitry and a slender cord with only one to four wire pairs. Moreover, electronic systems and the electronic telephones used with the systems provide a much broader range of desired features than does the typical electromechanical system. Consequently, sales of electronic business telephone systems have been growing at a rapid rate in recent years. Unfortunately, electronic systems are new and relatively unproven, while the 1A2 electromechanical system has been in use for more than 25 years and has proven to be a reliable and dependable business telephone system.

Electronic telephone systems are being sold to new installations and also to upgrade existing electromechanical systems. Unfortunately, where an electromechanical system is already installed, the cost of conversion from the electromechanical system to an electronic system is very high since the entire system must be replaced. The replaced equipment includes the electromechanical key service unit, the individual telephones and the cabling which extends between the key system unit and the telephones. Replacement, particularly of the key service unit, is required because electronic telephones work only with key service units which are specifically designed for electronic telephones. Replacement of the cabling is required because electronic systems utilize slender and flexible approximately 8-wire cords rather than the heavy 50-wire cables and large 50-pin connectors necessary for electromechanical systems.

It will therefore be appreciated that there is a need for a low cost and easy to install telephone conversion device which allows the user to continue using the existing electromechanical key service unit and 50-wire cabling, while allowing the use of full-feature electronic telephones. The conversion device should allow the interface of any single-line electronic telephone with any 1A2 electromechanical key service unit, including ones designed for rotary dial and push button systems.

Installation of the conversion device should not require the services of a telephone system technician and should be accomplished simply by plugging the device into the 50-pin connector located at the wall or floor outlet of the telephone user's stations, without any modification of the key service unit or the existing cabling or connectors. The conversion device should use a conventional slender and flexible conventional six to eight wire cord running between the outlet and the electronic telephone being used with the conversion device, thus doing away with the need for a relatively large, inflexible and unsightly 50-wire cable running between the outlet and the telephone. Further, the conversion device should allow the replacement of all the old electromechanical telephones being used with new full feature electronic telephones, and also allow the selective replacement of some telephones with electronic telephones while permitting the remainder of the electromechanical telephones to continue in operation. The conversion should be accomplished without modification of the key service unit or the 50-wire cabling or 50-pin outlet connector.

The conversion device should permit full utilization of the many desirable features provided by modern electronic telephones, and not provided by the electromechanical telephones being replaced, such as last number re-dial, automatic re-dial of busy numbers, one touch automatic dialing of stored numbers, memory for storage of telephone, access and credit card numbers, call conferencing, muting for privacy, two-way speakerphone operation, and the many other features provided by electronic telephones. In addition, the conversion device should retain the several benefits of the 1A2 system, and not provided by electronic telephones when used with multiple telephone lines, such as access to all lines without operator assistance, manually operable switches to select telephone lines and place lines on hold, and lights to visually indicate the status of the lines. Preferably, other benefits should be provided by the conversion device not usually provided by either electromechanical or electronic telephones.

In such manner, with use of the needed conversion device, not only will the user be allowed to selectively update existing electromechanical systems easily and at low cost without requiring the services of a telephone technician in order to acquire all the benefits of an electronic telephone, but the resulting telephone system will retain the benefits inherent with multiple-line systems and have benefits not provided by either electronic or electromechanical telephones.

DISCLOSURE OF THE INVENTION

The present invention resides in a telephone conversion device for converting a multiple line electromechanical telephone system having an electromechanical key system unit for use with an electronic telephone. The conversion device has line status sensing means for determining the operational status of the multiple lines by sensing the lamp driving signals provided by the key system unit, and generating a line status indicating signal in response thereto. A connection means is provided for connecting a common line to a selected one of the multiple lines in response to a connectio control signal. The conversion device also has means for electrically connecting the common line to the receiver/speakerphone of the electronic telephone with which the telephone conversation device is used, and detector means for detecting when the receiver/speakerphone of the electronic telephone is off-hook and generating an off-hook signal in response thereto.

A plurality of momentary contact line selection switches are provided with one of the switches corresponding to each of the multiple lines and being operable by the user to indicate selection of the corresponding line. A hold switch operable by the user is included to indicate selection of the then active one of the multiple lines to place on hold. Switch scanning means sense operation of any of the line selection switches or the hold switch, and generate a switch operatioin signal in response thereto.

The conversion device has a plurality of illuminable line sttus indicating lights. In the preferred embodiment the lights each include a pair of lights corresponding to each of the multiple lines, with one of the pair of lights being a first color and the other of the pair of lights being a second color. Selective ones of the pairs of lights are illuminated in response to a light control signal. A line status control means is provided for generating a status control signal indicating to the key system unit which of the multiple lines is to be active and which are to be placed on hold.

The conversion device further includes control means for generating the connection control signal to control the operation of the connection means and generating the light control signal to control the illumination of the line status lights. The control means operates in response to the line status indicating signal, the off-hook signal and the switch operation signal.

The control means includes memory means of storage of line identifications in a hold-queue indicating which of the multiple lines have been selected by operation of the hold switch to be placed on hold and the sequential order of the lines placed on hold. The control means is responsive to the off-hook signal indicating the receiver/speakerphone is off-hook and the switch operation signal indicating none of the line selection switches have been operated to indicate selection of one of the multiple lines, and in response thereto the control means automatically selects the one of the stored line identifications from the hold-queue for the line that has been placed on hold the longest. If no line identifications are in the hold-queue, the control means automatically selects an idle line based upon the line status indicating signal. The control means then generates the connection control signal which indicates the selected line from the hold-queue or idle lines to be connected the selected line to the common line by the connection means. As such, the user may be connected to the line which has been on hold the longest and if none to an idle line for calling out without first having to select a line by operation of one of the line selection switches. This avoids unintentional connection with a line put on hold by another user or an active line which is occupied by another user.

If there are no line identifications in the hold-queue and there are no idle lines, the control means will wait and select the first active line becoming idle and then cause the connection means to connect the selected idle line to the common line. As such, even if all lines are active when the user picks up the receiver the device will automatically connect him to the first line to become idle.

In the preferred embodiment, the light control signal generated by the control means indicates illuminatio of one of the pair of lights with the first color if the line corresponding to the pair of lights has been placed on hold by the user of the device or selected for connection to the receiver/speakerphone of the user, and indicates illumination of the other of the pair of lights with the second color if the line corresponding to the apir of lights has been placed on hold by a user of another conversation device or selected for connection to the receiver/speakerphone of the other user's conversion device.

Other features and advantages of the invention will become apparent from the following detailed description, taken in conjunction with the accompanying drawings.

BEST MODE FOR CARRYING OUT THE INVENTION

Figure 1:
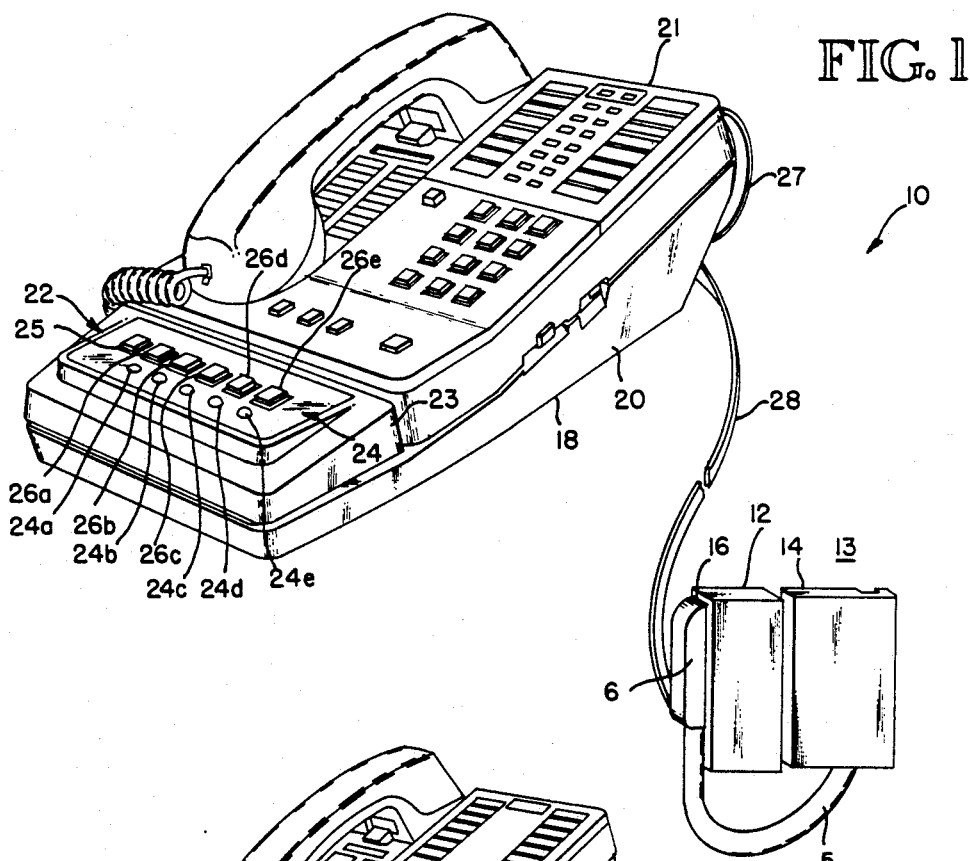
FIG. 1 is an isometric view of a telephone conversion device embodying the present invention shown with an electronic telephone in position on a keystrip unit portion of the device and a wall unit portion of the device mounted on a wall and connected to an electromechanical telephone system wall outlet cable.
Figure 2:
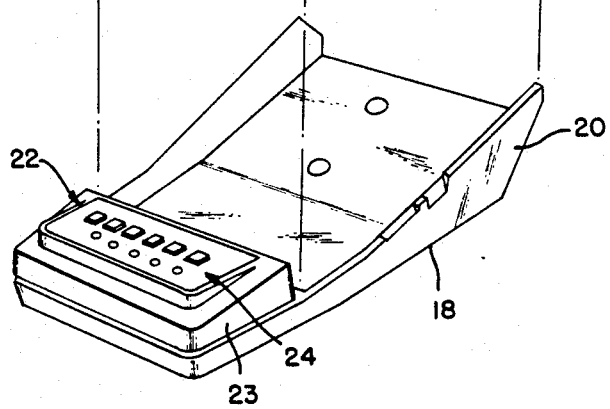
FIG. 2 is a reduced scale isometric view of a keystrip unit portion of the invention with the electronic telephone removed.
Figures 3, 4:
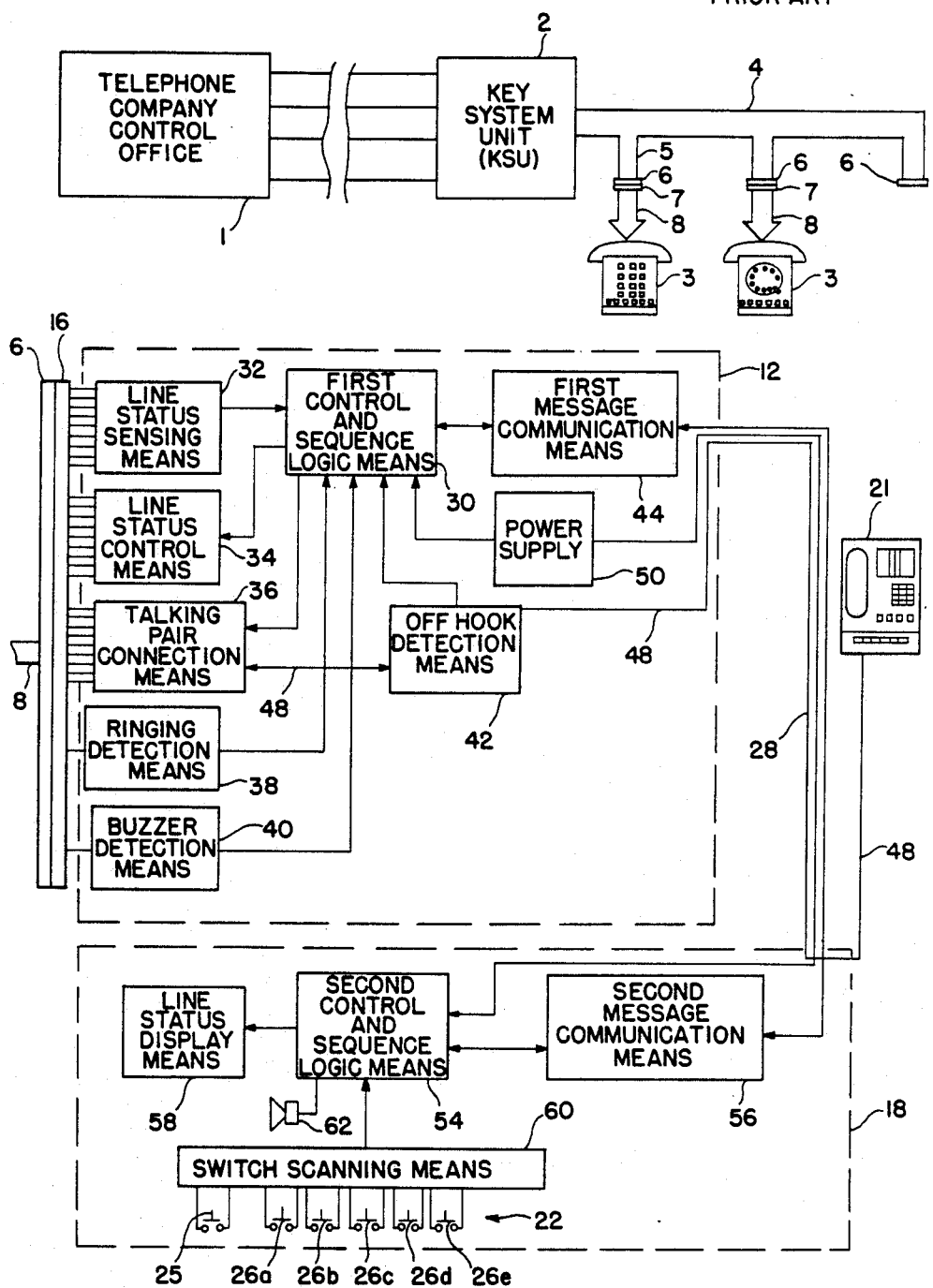
FIG. 3 is a block diagram of a prior art multi-line electromechanical system using the 1A2 standard showing multiple electromechanical telephones, one being push button and the other rotary dial.
FIG. 4 is a block diagram of the telephone conversion device of the present invention shown connected to the electronic telephone and the outlet connector of the electromechanical system.

A conventional electromechanical telephone system according to 1A2 standard and well-known in the art is shown in FIG. 3 and illustrates the multi-line electromechanical telephone system used by most businesses. A telephone company central office 1 provides multiple telephone lines to a key system unit (KSU) 2 which is positioned within the business office of the user. The KSU 2 provides the logic and control which operates a plurality of electromechanical telephones 3, each located at one of a corresponding plurality of telephone stations throughout the business office. The KSU 2 and the telephones 3 are interconnected by a 50-wire cable 4 which is usually run within the walls or floor of the business office, with a 50-wire outlet cable 5 extending out of the wall or floor at each telephone station. The outlet cable 5 terminates at each telephone station with a 50-pin outlet connector 6 for connection to a 50-pin connector 7 carried by a 50-wire cable attached to the telephone 3 for that station. As shown in FIG. 3 for purposes of illustration, the electromechanical telephone 3 may be an electromechanical push-button dial telephone or an electromechanical rotary telephone, each having illuminated push buttons to accommodate five telephone talking lines and a hold button. Of course, telephones with nine illuminated push buttons and a hold button can be utilized if the KSU 2 is designed for handling nine talking lines.

As shown in FIGS. 1, 2 and 4–6 for purposes of illustration, the present invention is embodied in a telephone conversion device, indicated generally by reference numeral 10. The conversion device 10 includes a wall unit 12 mountable on a wall 13 adjacent to a conventional telephone wall outlet box 14 for the electromechanical telephone system with which the conversion device is to be used. Of course, the wall unit 12 need not be actually mounted on the wall if a wall mounting is not desired. The wall unit 12 is provided with a 50-pin connector 16 for connection to the 50-pin outlet connector 6 of the electromechanical telephone system for the telephone station being converted for use with an electronic telephone. The outlet 50-wire cable 5 for the station extends out from the outlet box 14 and is electrically connected to the 50-wire cable 4 running within the wall or floor of building between the several telephone stations of the system and the electromechanical KSU 2 with which the conversion device is used, as shown in FIG. 3.

The conversion device 10 further includes a keystrip unit 18 having a telephone cradle portion 20 upon which a conventional electronic telephone 21 which is the replacement for the electromechanical telephone 3, may be positioned. The embodiment of the invention shown in the drawings is designed for a Panasonic model 2130 electronic telephone but with minor modification may be used with electronic telephones of other manufacturers. The keystrip unit 18 also has a switch-/display portion 23 with siz manually operable momentary contact switches arranged in a row, indicated collectively by reference numeral 22, and five lights arranged in a row adjacent to the switches 22, indicated collectively by reference numeral 24. The switches 22 are effectively substitutes for the six push-button switches of the replaced electromechanical telephone 3, and as will be described in more detail below, perform not only the old functions which were provided by the push-button switches of the replaced telephone, but also assist in providing advantages not available with either the replaced electromechanical telephone or the substituted electronic telephone when used without the conversion device 10 of the present invention.

The switches 22 include one hold function switch 25, and five line selection switches 26a–26e which each correspond to one of the five telephone system talking lines of the telephone system. The lights 24 include five two-color line status indicator lights 24a–24e which each correspond to the adjacently positioned one of the five line selection switches 26a–26e to indicate the status of the corresponding talking line, as will be described in more detail below. It is noted that the present invention may be used with telephone systems having nine talking lines by providing ten switches, with one being a hold function switch and the remainder being nine line selection switches corresponding to the nine talking lines.

The electronic telephone 21 is electrically connected to the key strip unit 18 by a short 4-wire interconnect cord 27 (only 2 wires of which are actually utilized) which plugs into both a jack (not shown) at the rear of the electronic telephone and a jack (not shown) at the rear of the cradle portion 20. It is noted that while the cradle portion 20 provides a convenient place to position the electronic telephone 21 to minimize the surface space taken up on the user's desk, the conversion device 10 of the present invention can be constructed in a manner not to physically support the telephone. It is further noted that in the embodiment of the invention being described, only an electrical connection between the telephone and keystrip unit 18 is required and there is no need for a mechanical interconnection except as may be desired to keep the telephone in place on the key strip unit cradle portion.

Extending between the keystrip unit 18 and the wall strip unit 12 is an 8-wire cord 28 (only six wires of which are actually utilized). The cord 28 is slender and flexible, and effectively replaces the rather unsightly and stiff 50-wire cable 8 which in the electromechanical system extends between the telephone 3 and the outlet connector 6 at the outlet box 14. With the conversion device 10 of the present invention, the conversion of the electromechanical telephone system to use the full feature electronic telephone 21 can be accomplished without modification of the electromechanical KSU 2, the wall/floor cable 4 or the outlet cable 5, thus avoiding the expense previously associated with replacing the KSU and the cabling when converting a system to use electronic telephones.

In addition, the conversion can be accomplished on a phone-by-phone basis, as and when desired, in that all of the old electromechanical telephones 3 need not be converted at once, if ever. The conversion of the electromechanical telephone system shown in FIG. 3 for use with electronic telephones, such as telephone 21, is accomplished by simply disconnecting the one or more of the electromechanical telephones 3 desired to be replaced from the outlet cable 5, and plugging the outlet cable at each station into the 50-pin connector 16 of the wall unit 12 of one of the conversion devices 10. In other words, if it is desired to replace three telephones, then three of the conversion devices 10 must be used and the devices are identical in design. If it is desired to convert only one or a few of the telephone stations, the remaining electromechanical telephone stations may continue to operate simultaneously with the electronic telephone stations using the old electromechanical telephones 3. The conversion can be completed quickly and easily without the necessity of employing a telephone technician, and without modification or replacement of the KSU 2 or the cables 4 and 5.

As best shown in block diagram in FIG. 4, the wall unit 12 includes a first control and sequence logic means 30 which controls the operation of the wall unit. The first control logic means 30 operates in conjunction with a line status sensing means 32, a line status control means 34, a talking pair connection means 36, a ring detection means 38, a buzzer detection means 40, an off-hook detection means 42, and a first message communication means 44.

The line status sensing means 32 receives and senses the push-button light driving signals provided over the cable 4 by the electromechanical KSU 2, which in the original system were provided to illuminate the lights positioned in the push buttons of the replaced electromechanical telephone 3. Based upon the sensed light driving signals, the line status sensing means 32 provides corresponding signals to the first control logic means 30 to control illumination of the line status indicator lights 24 of the keystrip unit 18. However, in addition to controlling light illumination, the first control logic means 30 uses the presence or absence of the light driving signals sensed by the line status sensing means 32 to also provide features not presently available in either the replaced electromechanical telephone 3 or the substituted electronic telephone 21.

In particular, based upon this line status information, if the user of the telephone 21 picks up the receiver (or activates the speakerphone of the telephone), thus closing the hookswitch, and without first pressing one of the line selection switches 26a–26e, the control logic means 30 will first search a queue of talking lines which have been put on hold by the user and automatically select and connect the line that has been on hold the longest time to the receiver. As will be described in more detail below, the first control logic means 30 establishes and updates a queue of lines put on hold by the user, but includes in the hold-queue only the lines that have been put on hold by the user or selected for addition to his hold-queue.

If the user has put no lines on hold, the first logic control means 30, based upon the line status information, will sequentially search for the first idle talking line of the five talking lines and automatically connect that line to the receiver. Consequently, if the user inadvertently or intentionally does not first press one of the line selection switches 26a–26e, the user will be connected to the oldest line he placed on hold, and if none are on hold, to an idle line. In such manner, the conversion device 10 does not require the user to remember which lines he placed on hold or even in which order they were placed on hold. In this manner, lines on hold may be conveniently answered based upon the order in which they were put on hold.

With the conversion device 10, the user is not required to first press one of the line selection switches 26a–26e in order to get connected to an idle line to make an outbound call. It has been found that telephone users of multi-line telephones frequently will pick up the receiver to make an outbound call before pressing the switch to select a line for that call. This tendency has been found to create a problem with conventional electromechanical telephones in that if the user picks up the receiver with the intention of making an outbound call and one of the push-button switches on his telephone is still depressed as a result of a prior conversation and the talking line corresponding to that switch is now busy, the user is connected to a line in use by others. This is, of course, embarrassing for all and disruptive for the parties on the occupied line. The present invention completely solves this problem, as described above. Since the line selection switches 26a–26e of the key strip unit 18 of the present invention are momentary contact switches, even the fact that a particular one of the switches had been pushed on a previous call to select a particular talking line, which might now be occupied by someone else, will not result in the user attempting to call out being unintentionally connected to an occupied talking line. Also, when the conversion device 10 is used in conjunction with a data transmission device such as a computer and modem, the automatic idle line selection feature permits the computer to transmit outbound data without the presence of an operator being required to make a line connection, all while using the conventional electromechanical telephone system.

In the event that the telephone user picks up the receiver without first pushing one of the line selection switches 26a–26e and there are no lines placed on hold by the user (i.e., in his queue), and there are no idle lines available for his use, the first control logic means 30 will simply wait for the next line to become idle and then automatically and immediately connect the telephone user with that line. As such, theuser is assured that as soon as a line is available he will be connected. Unlike with conventional electromechanical telephones, he need not watch the illuminated push-button switches waiting for a light to go out and then attempt to quickly depress the push-button switch for that line before someone else does so.

If the telephone user does press one of the line selection switches 26a–26e indicating that he wishes to be connected to the corresponding telephone talking line, the first control logic meand 30 will connect the user to that line at the instant the receiver is picked up to close the hookswitch.

If the telephone user presses the line selection switch a second time before picking up the receiver, the control logic means 30 will simply cancel the selection of the previously selected line. If the user has already picked up the receiver and the connection has been made, and then presses the line selection switch a second time, the control logic means 30 will simply disconnect the line. Additionally, the contrl logic means will treat the situation just as if the user had picked up the receiver without first pressing one of the line selection switches and searches his hold-queue to connect the user to the oldest line on hold and if none are on hold to the first idle line. This is accomplished without the user having to first hang up the receiver or press another one of the line selection switches to get connected to another line.

As will be described in more detail below, the line status indicator lights 24a–24e associated with each of the line selection switches 26a–26e can produce either red or green light and are under the control of the first control logic means 30. If the line status indicator light is not illuminated, the corresponding talking line is an idle line. When the light is green it indicates that the corresponding line is active and in use by the user either as a result of his manual selection of the line or by the automatic selection made by the the first control logic means 30, as discussed above. When the light is red it indicates that the corresponding line is active and in use by another user at a different station of the system.

If the light status indicator light is flashing green, it indicates that the user has placed the corresponding line on hold, and if the light is flashing red it indicates that another user has put the corresponding line on hold. In such manner, the telephone user is visually provided with information which allows him to not only determine whether or not a line is idle, active or on hold, but also to determine whether he or another user is connected to the active line and whether he or another user is put the line on hold. Of course, multiple flashing green lights indicate that the user has put more than one of the lines on hold, and multiple flashing red lights indicate that other users have put the corresponding lines on hold.

It is noted that while as described above, if the user has not first pressed one of the line selection switches 26a–26e before picking up the receiver (or activating the speakerphone), the user will be automatically connected to the first in his queue of lines on hold (i.e., the lines with flashing green lights), and if there are no lines in the hold-queue he will be connected to the first idle line. Should the user elect to first depress one of the switches, he will be connected to the corresponding talking line. The connection will be made whether or not the corresponding line is idle (light not illuminated), in use by someone else (a constant red light) or placed on hold by the user or someone else (i.e., a flashing green or red light). In other words, the telephone user has the ability to be connected to any line he selects if he presses one of the line selection switches 26a–26e before picking up the receiver. If he elects not to do so, he will be automatically connected by the first logic control means 30 to only the lines he has put on hold and in the order of his hold-queue, and if no calls of his are on hold, he will be connected to the first idle line. There are features which are not available in either conventional electromechanical or electronic telephones.

In the event that without first picking up the receiver the telephone user presses one of the line selection switches 26a–26e for a line which has been placed on hold by another user (i.e., a flashing red light), that line will be automatically added to the top of the user's hold-queue by the first logic control means 30 and the corresponding one of the line status indicator lights 24a–24e will be caused to begin flashing green. When a user adds a line on hold to his queue which was originally placed on hold by another user, the corresponding line status indicator light on the keystrip unit 18 for both users will flash green and the line will be on the hold-queue of both users. If either of the users should thereafter press the line selection switch corresponding to that line and then pick up the receiver to indicate he wishes to be connected to that line, or just pick up the receiver without first pressing the switch, the user will be connected to the line and at that time the line status indicator light corresponding to the line will change to a constant gree. Simultaneously, the line status indicator light on the keystrip unit 18 of the other user will change from a flashing green to a constant red, indicating to the other user that someone else is now on that line.

Whenever any user is connected to a line which has been on hold, regardless of whose hold-queue the line is in, that line will be automatically removed from every hold-queue. Similarly, if the person who is on the line hangs up to disconnect that line, that line will be automatically removed from every hold-queue.

In a similar fashion as discussed above for adding a line which is in the hold-queue of another, if the user presses one of the line selection switches 26a–26e for a line which is in use by another user (i.e., a constant red light), the light will change to a constant green for the user and the user will be connected to that line when he picks up his receiver. In the event that the line has been put on hold by the other user after the user has pressed the corresponding line selection switch but before the user can pick up his receiver, the first logic control means 30 will automatically add the line to the top of the user's hold-queue. As such, when the user picks up his receiver he will have the line at the top of his hold-queue and the first control means 30 will select that line from the hold-queue for connection to the receiver. It is noted that had the other user placed the line on hold before the user could press the corresponding line selection switch, the line would have been placed at the top of the user's hold-queue as described above and then automatically selected from the hold-queue for connection to the receiver when the receiver was picked up. This avoids the first logic control means 30 doing an automatic selection and connecting the user to a different line from the hold-queue before the user can accomplish a connection manually when the users are attempting to transfer a line answered from one station to another.

The operation of the first control logic means 30 described above requires information as to whether or not the receiver is off-hook (or the speakerphone activated). This information is supplied to the first control logic means by the off-hook detection means 42 which senses current flow through a common talking wire pair 48 connected to the hookswitch (not shown) of the receiver of the telephone 21. The talking pair connector means 36 connects the common talking wire pair 48 to a selected one of the five talking lines (each line comprising a pair of wires) carried by the 50-wire cables 4 and 8 from the KSU 2 and connected to the connection means through the connector 16.

The first control logic means 30 selects the particular one of the talking line pairs to be connected to the common talking wire pair by the connection means 36. The selection is made by the first control logic means 30 in response to the user pressing one of the line selection switches 26a–26e, or as previously described, by the user picking up the receiver without first pressing one of the switches causing the first control logic means to automatically select a line in the user's hold-queue or the first idle line.

The line status control means 34, using information provided to it by the first control logic means 30, provides line status indicating signals to the KSU 2 which indicate the status of the five telephone talking lines. In particular, the line status control means 34 indicates which of the lines is active and connected to the common talking wire pair 48 by the talking pair connection means 36 with the telephone receiver off the hook. In this case the line is connected to the receiver under a normal talking hookup. The line status control means 34 will also indicate whether the line is active but has been placed on hold, or whether the line is inactive.

The first message communication means 44 is provided to facilitate transmitting information to and receiving information from the keystrip unit 18. The transmitted information includes information to control illumination of the status indicator lights 24 associated with the line selection switches 26a–26e and generation of ringing and buzzing sounds at the keystrip unit 18 to indicate incoming calls and intercom usage, respectively. The received information includes information sent by the keystrip unit 18 on closure of the line selection switches 26a–26e.

The ringing detector means 38 senses the presence of a ringer signal on the appropriate wire pair of cable 8 provided by the KSU 2 to ring the bell/piezoelectric transducer in the telephone to which it is connected for indicating an incoming call. Similarly, the buzzer detection means 40 senses the presence of a buzzer signal on the appropriate wire pair of cable 8 to drive the buzzer in the telephone for indicating operation of the intercom. In both instances the presence of the ringer or buzzer signals is indicated to the first control logic means 30, which then communicates a signal to the keystrip unit 18 to create a corresponding sound at the keystrip unit rather than in the electronic telephone 21.

Also positioned within the wall unit 12 is a power supply means 50 which supplies power to both the wall unit and the keystrip unit 18. The power to the keystrip unit 18 is supplied through a pair of power lines 52 comprising two of the wires in the cord 28.

Still referring to FIG. 4, the keystrip unit 18 will now be described. The keystrip unit includes a second control and sequence logic means 54, a second message communication means 56, a line status display means 58 which includes the line status indicator lights 24, a button scanning means 60, a sound generator means 62 and the switches 22. As with the first message communication means 44 in the wall unit 12, the second message communication means 56 in the keystrip unit 18 is provided to facilitate communication of information between the wall unit and the keystrip unit.

The line station display means 58 includes the two color line status indicator lights 24a-24e previously discussed, which produce the one red light and one green light associated with each of the line selection switches 26a-26e, as will be described in more detail below. The line station display means 58 is under the control of the second control logic means 54, which is itself responsive to the first control logic means 30 of the wall unit 12.

The switch scanning means 60 senses the momentary depression of anyone of the switches 22 (which include the hold function switch 25 and the line selection switches 26a-26e), and provides that information to the second control logic means 54. This information is communicated through the second message communication means 56 to the first control logic means 30 in the wall unit 12.

The sound generator means 62 is controlled by the second control logic means 54 in response to information provided by the first logic control means 30 based upon the signals generated by the ringing detection means 38 and the buzzer detection means 40. The information is used by the sound generator means 62 to generate ringing and buzzing noises necessary to indicate an incoming call and intercom activation, respectively.

Figure 5A:
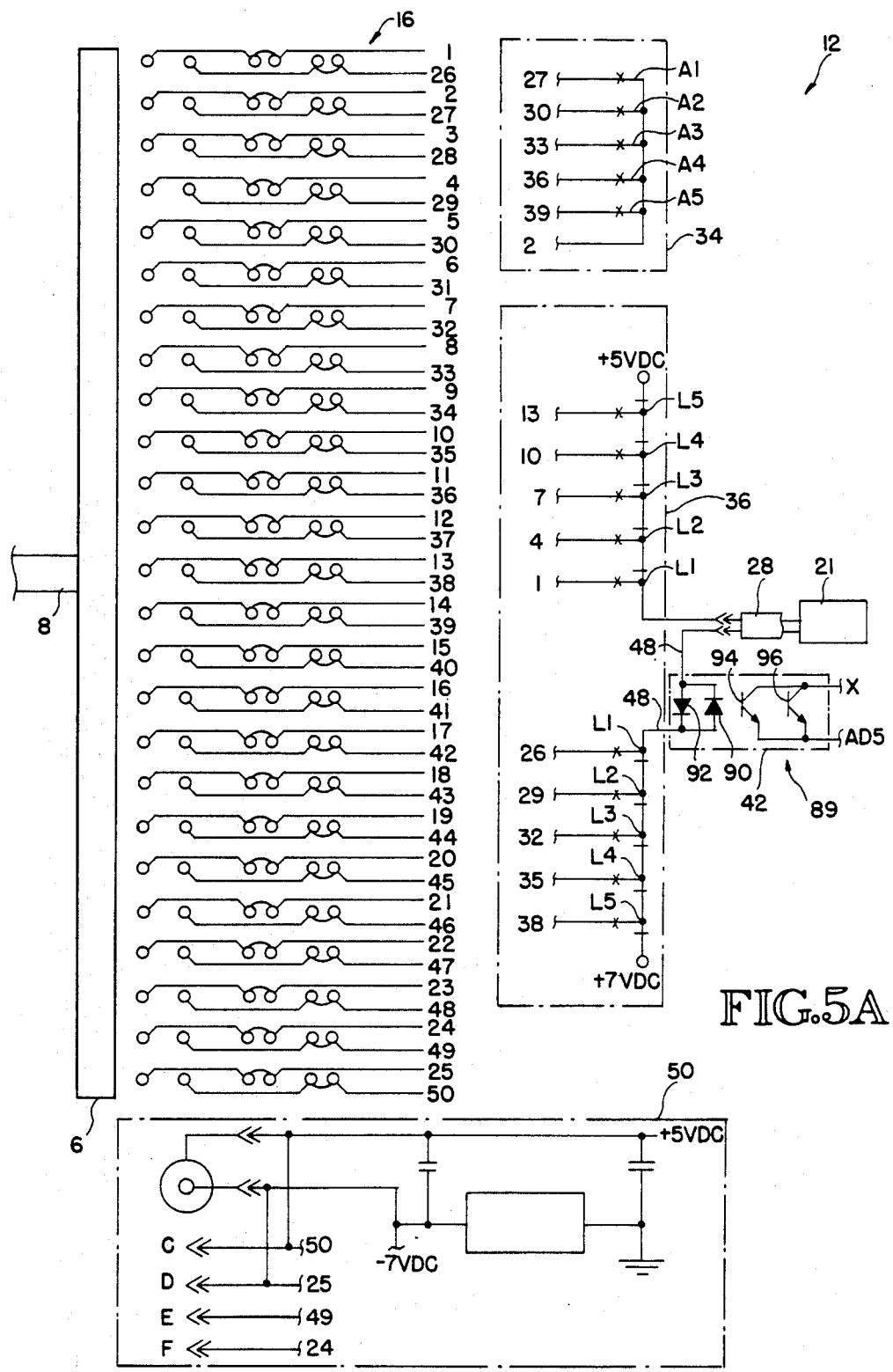
FIGS. 5A, 5B and 5C comprise an electrical schematic drawing of the wall unit portion of the device shown in FIG. 4.
Figure 5B:
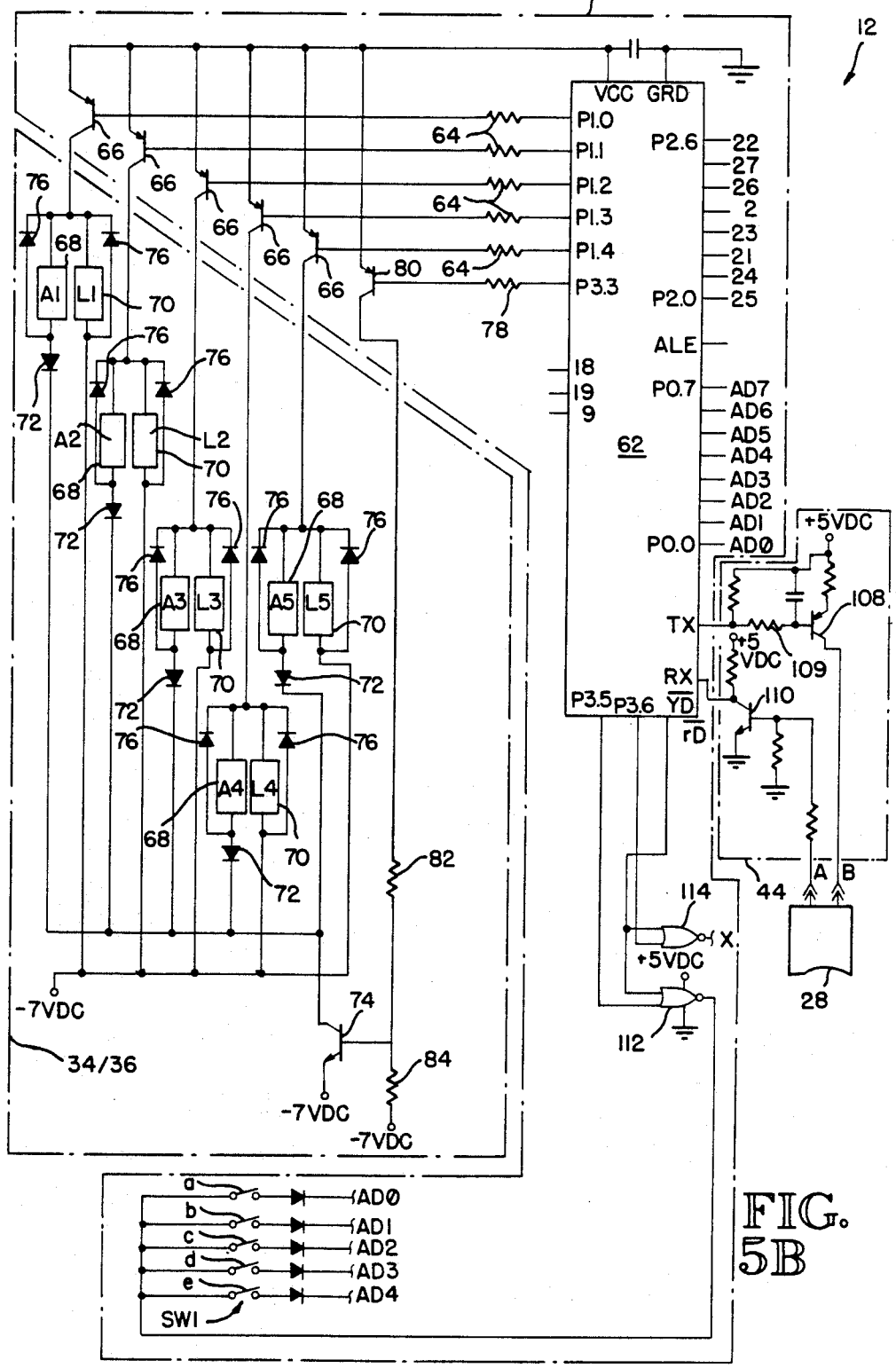
Figure 5C:
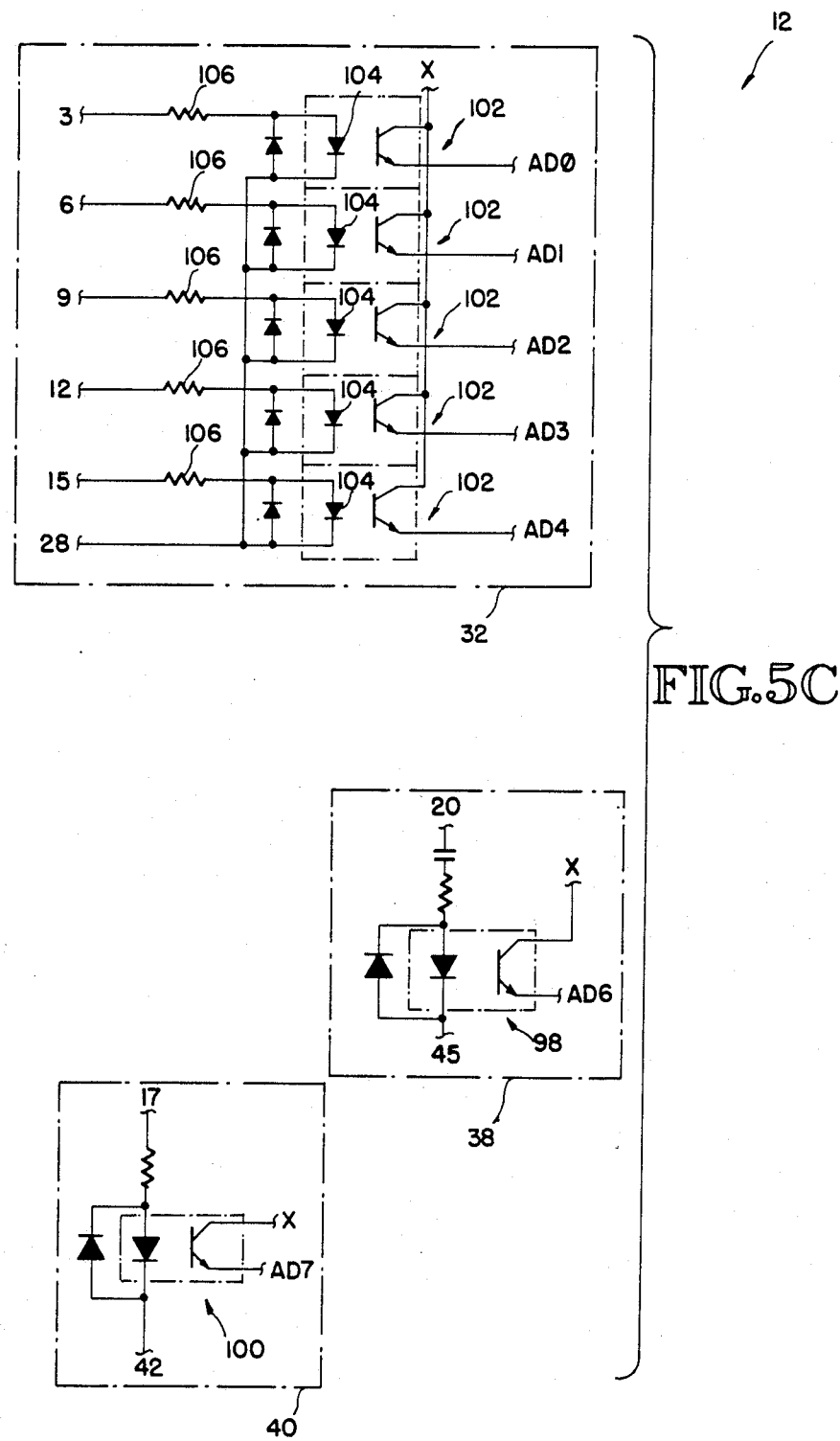

Referring now to FIGS. 5A, 5B and 5C, the detailed circuitry for the wall unit 12 will be described. As shown in FIG. 5B, the first control logic means 30 includes a microprocessor 62 operating as a state machine and five relay drivers connected to microprocessor output ports P1.0, P1.1, P1.3 and P1.4. The relay drivers each comprise a resistor 64 connected in series between the output port and the base of a corresponding PNP transistor 66. The five output ports P1.0-P1.4 of the microprocessor 62 provide control signals to supply the coil winding drive current for five relays L1-L5 comprising a part of the talking pair connection means 36 and for five relays A1-A5 comprising a part of the line status control means 34.

The collector of each of the transistors 66 is connected to one wire of a coil winding 68 for one of the A-relays which corresponds to one of the five talking lines. The collector is also connected to one wire of a coil winding 70 for one of the L-relays which corresponds to the same talking line. As such, the transistor 66 simultaneously supplies coil winding drive current to a pair of "A" and "L" relays corresponding to one talking line. The "A" and "L" relays are paired together with a common drive as follows: A1 and L1; A2 and L2; A3 and L3; A4 and L4; and A5 and L5. For each of the A-relays, the other wire of the coil winding 68 is connected through a diode 72 to the collector of a single NPN transistor 74 which serves as a switch to selectively and simultaneously deactivate the coil windings 68 for all of the A-relays independent of the L-relays. The emitter of the transistor 74 is connected to $-7$ VDC.

The other wire of the coil winding 70 for each of the L-relays is connected directly to $-7$ VDC. The emitters of the transistors 66 are connected to the VCC pin of the microprocessor 62. Each of the coil windings 68 and 70 of the "A" and "L" relays is provided with a reverse protection diode 76 connected across the coil winding.

The output port P3.3 of the microprocessor 62 is connected through a resistor 78 to the base of a PNP transistor 80, and the collector of the transistor is connected through an in-series resistor pair 82 and 84 to $-7$ VDC. The common node of the resistors 82 and 84 is connected to the base of the transistors 74 to provide the drive to control its operation. The emitter of the transistor 80 is connected to the VCC line of the microprocessor 62.

With this arrangement, the microprocessor 62 can selectively activate the coil windings 68 and 70 of a selected pair of the "A" and "L" relays which corresponds to the particular line selection switch 26a-26e that is pressed. For example, if the telephone user presses the switch 26a which corresponds to the first talking line, the microprocessor 62 will put a drive signal on the base of the transistor 66 which provides coil winding drive to the coil winding 68 and 70 of relays A1 and L1. As will be described in detail below, this will cause the contacts of these relays to change state and connect the corresponding talking line to the telephone 21. If the receiver is off-hook so as to close the hookswitch, the corresponding talking line will be connected for normal talking operation.

As previously stated, the A-relays form a part of the line status control means 34, and as will be described in more detail below, when the coil winding 68 for one of the A-relays is activated, its contacts will change position and provide an indicating signal to the KSU 2 indicating the status of the corresponding talking line as being active and in a talking mode. In the event that the line is subsequently put on hold, the microprocessor 62 will provide a drive signal to the transistor 80 and that transistor will turn off the common transistor 74 for the A-relays, thus deactivating the coil windings 68 of the A-relays which have been activated. This provides a signal to the KSU 2 indicating that the corresponding talking line has been place on hold. Should the receiver of the telephone 21 be hung up to open the hook switch, the microprocessor 62 terminates the drive signal being provided to the transistor 66 which corresponds to the disconnected line.

The contacts for the "A" and "L" relays are shown in FIG. 5A. Using conventional schematic representation, the normally open contacts (indicated by "X") for the single pole/single throw relays A1-A5 have one contact connected in parallel to pin 2 of the connector 16, and the other contact connected to one of five different pins of the connector 16 as required to transmit the line status information to the KSU 2.

Again using conventional schematic representation, the contacts of the relays L1-L5 are shown in FIG. 5A. Each of the L-relays has a double pole/double throw contact. The normally closed contacts (indicated by "—") and the wipers for the first set of contacts of the L-relays are connected in series between $+5$ VDC and the one wire of the pair of wires comprising the common talking line wire pair 48 which, as previously described passes through the cable 28 extending between the wall unit 12 and the keystrip unit 18 and is connected to one terminal of hookswitch for the single line electronic telephone 21.

The normally closed contacts and wipers for the second set of contacts of the L-relays are connected in series between $-7$ VDC and the other wire of the pair of wires comprising the common talking line wire pair 48. This wire is connected to the off-hook detection means 42 and then passes through the cable 28 for connection to the other terminal of the hookswitch. It is noted that the common talking line wire pass simply passes through the keystrip unit 18 and terminates at a jack (not shown) at the rear of the keystrip unit to which the electronic telephone 21 is electronically connected by the cord 27. The normally open contacts (indicated by "X") of each of the first and second sets of contacts of the relays L1-L5 are connected to ten different pins of the connector 16, with each of the normally open contacts of the first set being connected to the tip line of the KSU 2 for the talking line corresponding to the relay and with the normally open contacts of the second set being connected to the ring line of the talking line corresponding to the relay.

The off-hook detection means 42 includes two optical couplers 89 with the one coupler having a light emitting diode 90 and the other coupler having a light emitting diode 92 which are connected in parallel with each other in reverse arrangement and in series with one wire of the common talking pair 48. The diode 90 operates with a corresponding phototransistor 94, and the diode 92 operates with a corresponding phototransistor 96. As will be indicated in more detail below, the optical couplers 89 provide a signal indicating that the hookswitch is closed as a result of the receiver being taken off hook (or the speakerphone being activated) based upon the diodes 90 or 92 detecting current flow on the common talking line pair 48.

In operation, if none of the relays L1-L5 are activated by pressing one of the line selection switches 26a-26e, the contacts of the first and second sets of contacts for the L-relays remain in their deactivated position. In this position, the normally closed contacts and wipers of the two relay sets are connected in series and provide a direct connection between +5 VDC through the closed hookswitch of the telephone 21 and through the diode 90 of the optical coupler 89 to -7 VDC. As such, the optical coupler 89 will generate an off-hook signal indicating that the telephone is off-hook. This signal is transmitted to the input port port AD5 of the microprocessor 62.

In the event that one of the L-relays is activated and the hookswitch is closed, the normally closed contacts for that relay will open, thus cutting off the path between the +5 and -7 VDC, and making connection between the tip and the ring lines supplied by the KSU 2 for the selected corresponding talking line. In so doing, current will flow through one or the other of the diodes 90 or 92, and their corresponding phototransistors 94 or 96 will generate an off-hook detection signal indicating the receiver is off-hook and supply that signal to the input port AD5 of the microprocessor 62. It is noted that anL-relay may be activated either by pressing one of the line selection switches 26a-26e to select the talking line or by the microprocessor 62 comprising part of the first control logic 30 providing a drive signal to one of the transistors 66 in order to automatically select the first line in the hold-queue for the user or the first idle line if no calls are in the hold-queue.

As shown in FIG. 5C, the ringing detection means 38 includes an optical coupler 98 which operates in response to current flow between pins 20 and 45 of the connector 16. These pins correspond to the common audible ringing pair carried on the cables 2 and 6 which are controlled by the KSU 2. The optical coupler 98 generates a ringing detection signal on an input port AD6 of the microprocessor 62.

The buzzer detection means 40 is shown in FIG. 5C and also includes an optical coupler 100 which operates in response to current flow between pins 17 and 42 of the connector 16. These pins correspond to the buzzer paid carried on the cables 2 and 6 which are controlled the KSU 2. The optical sensor 100 generates a buzzer detection signal on an input port AD7 of the microprocessor 62.

As shown in FIG. 5C, the line status sensing means 32 includes five optical couplers 102. Each of the optical couplers 102 has the anode of its light emitting diode 104 connected through a resistor 106 to one of the pins of the connector 16, which is the pin on which the KSU 2 provides the light driving signal for a corresponding talking line. The cathode of each of the diodes 104 is connected in parallel to a common ground line which is connected to a pin of the connector 16, which is the pin on which the KSU provides a common ground line. With this arrangement, if a light driving signal is provided by the KSU to indicate that one of the lines is active or on hold, current flows through the diode 104 of the corresponding one of the optical couplers 102 and generates a status indicating signal on a corresponding one of input ports AD0-AD4 of the microprocessor 62.

As previously described, the status of the talking lines is determined based upon the light driving signal provided by the KSU 2 and is used by the microprocessor 62 not only to control the line status indicator lights 24a-24e of the keystrip unit 18 but also to provide the information which is necessary for the microprocessor 62 to determine which lines are on hold and which lines are idle so that if the user picks up the receiver without first pressing one of the line selection switches 26a-26e, the microprocessor will know whether to select a held line from his hold-queue or an idle line. Of course, the information is also used to establish and maintain the hold-queue for the user.

Since the microprocessor operates as a digital state device, and in the presently preferred embodiment operates with binary voltage signals of 0 or 5+ volts, and the transmission over the cord 28 connecting the wall unit 12 and the keystrip unit 18 is preferably operated on binary current signals of 0 and 3 milliamps, to communicate over the cord 28 it is necessary to provide a buffer. This is accomplished by the first message communication means 44 which, as shown in FIG. 5B, comprises a PNP transistor 108 connected to the output port TX of the microprocessor 62 through a resistor 109, and a transistor 110 connected to the input port RX of the microprocessor. The transistors 108 and 110 provide for the necessary current/voltage interface and the associated circuitry is of conventional design.

The first control logic means 30 further includes five dip-switches SW1a-e which each correspond to one of the talking lines for selectively defeating the automatic line selection feature previously discussed. One or more of the dip-switches can be selectively closed to provide an inhibit signal on the corresponding input ports AD-0-AD4 of the microprocessor 62 to prevent the microprocessor from automatically selecting a particular one of the talking lines when the user picks up the receiver without having first pressed one of the line selection switches 26a-e. In such manner, if one of the talking lines is a Watts line or a computer communication line which should not be automatically selected for outgoing calls, the microprocessor 62 can be inhibitive from doing so. One terminal of each of the dip-switches is connected in parallel to the output of a NOR gate 112. The inputs of the NOR gate are connected to output ports P3.5 and rD of the microprocessor which control the operation of the NOR gate.

Another NOR gate 114 is also provided with its inputs connected to output ports P3.6 and rD of the microprocessor 62 which control the operation of the NOR gate. The output of the NOR gate 114 is connected to a common line indicated by letter "X" and shown in FIGS. 5A and 5B as being connected to the collectors of the phototransistors of the optical couplers 102 comprising the line status sensing means 32, to the collectors of the phototransistors 94 and 96 of the optical coupler 89 comprising the off-hook detection means 42, to the collector of the phototransistor of the optical coupler 98 comprising the ringing detection means 38, and to the collector of the phototransistor of the optical coupler 100 comprising the buzzer detection means 40.

The output port rD of the microprocessor 62 supplies a read pulse (a binary "0") to read the data signals provided on microprocessor input ports AD0-AD7 by the optical couplers of the line status sensing means 32, the off-hook detection means 42, the ringing detection means 38 and the buzzer detection means 40. The output port P3.6 supplies the other input for the NOR gate 114 and controls whether the NOR gate supplies a signal to these various sensing and detection means to permit their operation, or inhibits the NOR gate at the time the output port rD supplies a read pulse, thus maintaining the output of the NOR gate in the binary "0" state (0 VDC). This effectively allows multiplexing of data signals on the input ports AD0-AD7. The multiplexing is necessary because the dip-switches SW1a-e are also connected to the input ports AD-AD4 of the microprocessor 62.

The output port P3.5, which is normally at a binary "1" state, controls whether the NOR gate 112 supplies a signal through any ones of the dip-switches which have been set closed to inhibit automatic selection of their corresponding talking line, when the output port rD supplies a read pulse. The signals on output ports P3.5 and P3.6 are coordinated by the microprocessor 62 to accomplish the multiplexing and avoid simultaneous application of more than one data signal on any one of the microprocessor input ports AD0-AD7.

The wall unit 12 also houses the power supply means 50 which is shown in FIG. 5A and is of convention design. The power supply means places the +5 VDC and −7 VDC voltages on lines C and D, respectively, of the cord 28.

As shown in FIG. 5A, the connector 16 of the wall unit 12 has jumper strips which are provided in case the signals on the outlet connector 6 are for any reason not on the appropriate pins, such as sometimes occurs as a result of cable wire changes in the electromechanical system with which the conversion device 10 is to be used.

Figure 6A:
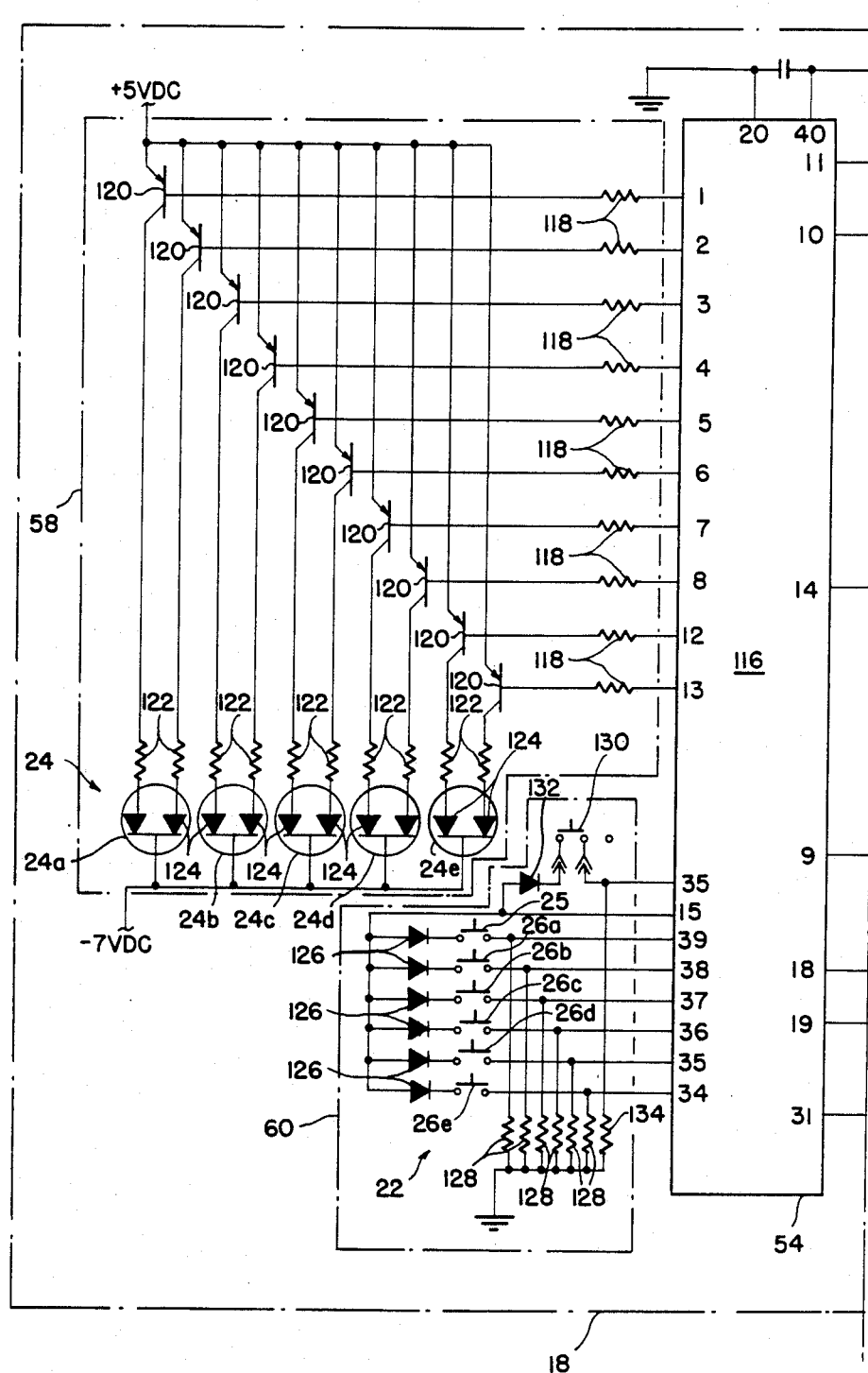
FIGS. 6A and 6B comprise an electrical schematic drawing of the keystrip unit portion of the device shown in FIG. 4.
Figure 6B:
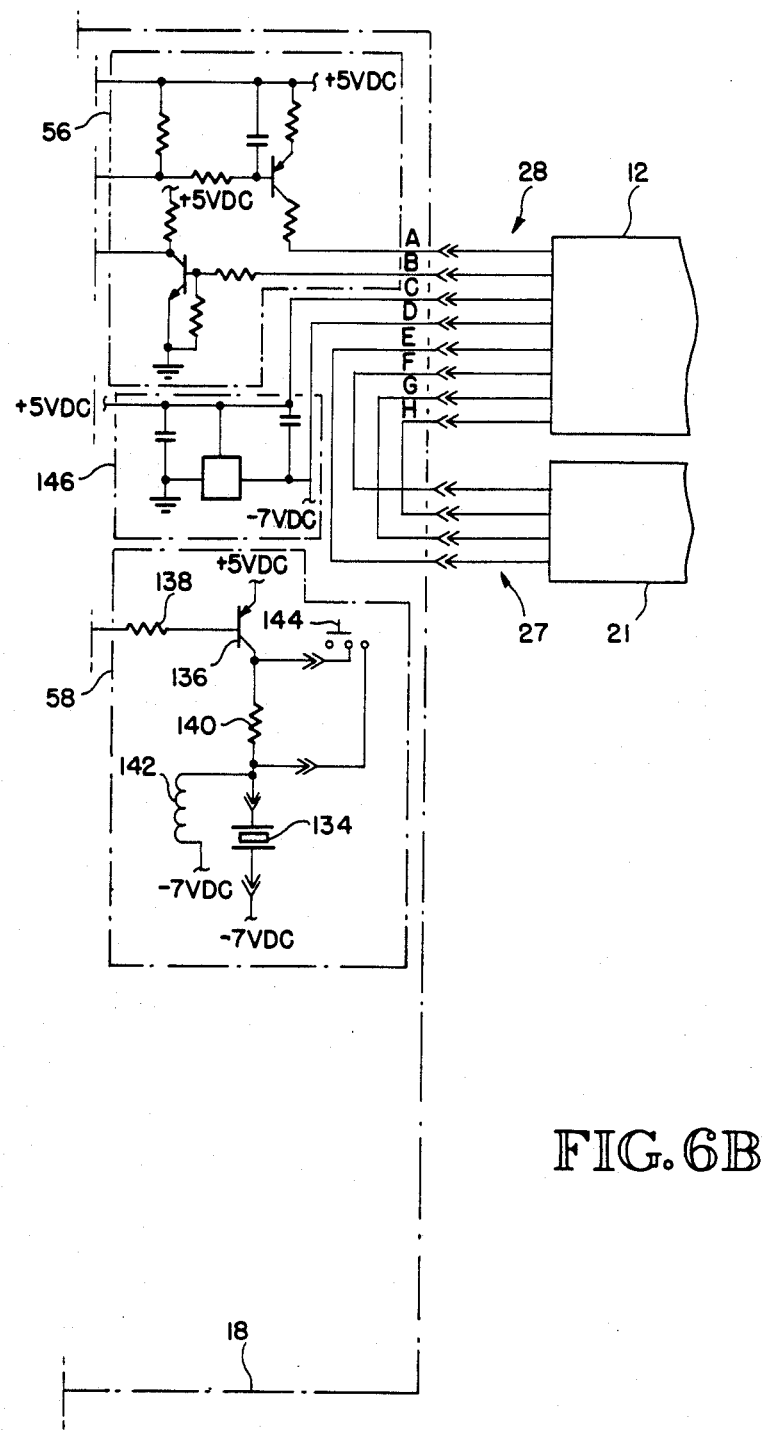

The circuitry for the keystrip unit 18 is shown in FIGS. 6A and 6B, and will now be described. The second control logic means 54 includes a microprocessor 116 having ten output ports which are each connected through a resistor 118 to the base of a light driver PNP transistor 120. The collector of each transistor 120 is connected through a resistor 122 to the anode of one of ten light emitting diodes (LED) 124. The cathodes of the LEDs 124 are each connected to −7 VDC. The emitter of each transistor 120 is connected to +5 VDC.

The LEDs 124 are grouped in pairs, and each pair comprises one of the line status indictor lights 24a-24e. Each pair includes one LED which emits green light when powered and one LED which emits red light when powered. The microprocessor 116 provides drive signals to selected ones of the transistors 120 to illuminate selected ones of the red and green LEDs to provide the features previously described. The LEDs 124 may be powered for constant illumination to indicate the corresponding talking line is active either by the telephone user (i.e., a constant green) or by another telephone user (i.e., a constant red), or powered for flashing illumination to indicate the telephone user has placed a line on hold or selected the line for inclusion in his hold-queue (i.e., a flashing green) or another telephone user has placed a line on hold (i.e., a flashing red).

As previously noted, it is possible for one user to add a line to his hold-queue that was placed on hold by another so that the line will be on the hold-queue for both telephone users. In this situation both users will see a flashing green. Whichever user takes the line off hold first will cause the microprocessor 62 through the microprocessor 116 to illuminate the corresponding LED 124 with a constant green for that user, and a constant red for the other user. The line is, of course, then taken off the hold-queue for both users.

The switch scanning means 60 is shown in Figure 6A. To accomplish the scanning the microprocessor 116 selectively scans the switches 22, including hold switch 25 and line selection switches 26a-26e, by providing a pulse on an output port 15. The output port is connected to the anode of each of six diodes 126 in the switch scanning means 60. Each diode 126 has its cathode connected to one terminal of one of the momentary contact line selection switches 26a-26e. The other terminal of each switch is connected through one of six resistors 128 to ground, and is also connected to a corresponding input port of the microprocessor 116. In operation, the microprocessor provides a scan pulse to the line selection switches 26a-26e through the diodes 126, and if the switch is pressed to cause closure, current is conducted through the corresponding resistor 128 to supply an activation indicating signal to the microprocessor input port corresponding to that switch.

The keystrip unit 18 further includes a slide switch 130 (see FIG. 6A) not previously described which is connected in the same manner as the line selection switches 26a-26e. The output port 15 of the microprocessor 116 providing the scan pulse also provides the pulse to a diode 132 connected to one terminal of the switch 130. The other terminal of the switch 130 is connected through a resistor 134 to ground, and is also connected to a corresponding input port 33 of the microprocessor. The switch 130 is located at the back of the cradle portion 20 of the keystrip unit 18 so as to be out of sight, but operable by the telephone user. The switch 130 can be set in the open or closed position, and allows the user to selectively disable the ringer function for his conversion device 10.

Operation of the switch 130 provides a signal to the microprocessor 116 effectively instructing it not to generate the ringer noise. This is to allow a telephone user who does not desire to have all inbound calls of the telephone system ringing on the telephone 21 at his telephone station to prevent such from happening. At the same time it allows other users, particularly the user at the station assigned to serve as the operator and answer inbound calls, to have the ringing.

The sound generator 62 in the keystrip unit 12 includes a piezoelectric crystal 134 and a PNP transistor 136, as shown in FIG. 6B. An output port 14 of the microprocessor 116 is connected through a resistor 138 to the base of the transistor 136, and the collector of the transistor is connected through a resistor 140 to one terminal of the piezoelectrical crystal 134. The emitter of the transistor 136 is connected to +5 VDC. An inductor 142 is connected in parallel with the piezoelectric crystal 134, and the other terminal of the crystal is connected to −7 VDC. A slide switch 144 toggled with the switch 130 is connected in parallel with the resistor 140 and allows for selection of the volume level of the sound created by the piezoelectric crystal.

In response to the drive signal provided on the output port 14 of the microprocessor 116 to the base of the transistor 136, the piezoelectric crystal 134 produces sound at one of two frequencies to provide a ringer noise to indicate an incoming call or a buzzing noise to indicate a call being made over the intercom. As previously noted, the switch 130 can be set to inhibit the microprocessor 116 from sending the drive signal to create the ringer noise if so desired.

The second message communication means 56 is shown in FIG. 6B and is substantially identical in design to the first message communication means 44 of the wall unit 12 shown in FIG. 5B. As with the first message communication means 44, the second communication means provides the necessary current/voltage interface for communication between the microprocessor 116 of the keystrip unit 18 and the microprocessor 62 of the wall unit 12, and the associated circuitry is of conventional design.

Also shown in FIG. 6B is a power regulator, indicated generally by reference numeral 146. The power regulator 146 is connected to the wires C and D of the connector 28 which conduct the +5 VDC and the −7 VDC voltage generated by the power supply 50 in the wall unit 18.

It will be appreciated that, although a specific embodiment of the invention has been described herein for purposes of illustration, various modifications may be made without departing from the spirit and scope of the invention. Accordingly, the invention is not limited except by the appended claims.

I claim:

1. A telephone conversion device for converting a multiple line electromechanical telephone system having an electromechanical key system unit for use with an electronic telephone, comprising:

line status sensing means for determining the operational status of the multiple lines by sensing the lamp driving signals provided by the key system unit, and generating a line status indicating signal in response thereto;

connection means for connecting a common line to a selected one of the multiple lines in response to a connection control signal;

means for electrically connecting said common line to the receiver/speakerphone of the electronic telephone with which the telephone conversion device is used:

detector means for detecting when the receiver/speakerphone of the electronic telephone is off-hook, and generating an off-hook signal in response thereto;

a plurality of momentary contact line selection switches, one of said switches corresponding to each of the multiple lines and being operable by the user to indicate selection of the corresponding line;

a hold switch operable by the user to indicate selection of the then active one of the multiple lines to place on hold;

switch scanning means for sensing operation of any of said line selection switches or said hold switch, and generating a switch operation signal in response thereto;

a plurality of illuminable line status indicating lights, with one of said lights corresponding to each of the multiple lines, selective ones of said lights being illuminated in response to a light control signal;

line status control means for generating a status control signal indicating to the key system unit which of the multiple lines is to be active and which are to be placed on hold; and control means for generating said connection control signal to control the operation of said connection means and generating said light control signal to control the illumination of said line status lights, said control means oprating in response to said line status indicating signal, said off-hook signal and said switch operation signal, said control means including memory means for storage of line identifications in a hold-queue indicating which of the multiple lines have been selected by the user's operation of said hold switch to be placed on hold and the sequential order of the lines placed on hold by the user, said control means, in response to said off-hook signal indicating the receiver/speakerphone is off-hook and said switch operation signal indicating none of said line selection switches have been operated to indicate selection of one of the multiple lines, automatically selecting the one of said stored line identifications from said hold-queue for the line that has been placed on hold the longest, and if no line identifications are in said hold-queue automatically selecting an idle line based upon said line status indicating signal, and then generating said connection control signal indicating said selected line from said hold-queue or idle lines to said connection means to cause said connection means to connect said selected line to said common line, whereby the user may be connected to the line which has been on hold the longest and if none to an idle line for calling out without first having to select a line by operation of one of said line selection switches, thus avoiding unintentional connection with a line put on hold by another user or an active line which is occupied by another user.

2. The telephone conversion device of claim 1 wherein if there are no line identifications in said hold-queue and there are no idle lines, said control means includes means for waiting and selecting the first active line becoming idle and then causing said connection means to connect said selected idle line to said common line, whereby even if all lines are active when the user picks up the receiver the device will automatically connect him to the first line to become idle.

3. The telephone conversion device of claim 1 wherein each of said lights includes a pair of selectively illuminable lights, one of said pair of lights being a first color and the other of said pair of lights being a second color, and wherein said control means includes means for generating said light control signal to indicate illumination of one of said pair of lights with said first color if the line corresponding to said pair of lights has been place on hold by the user of the device or selected for connection to the receiver/speakerphone of the user, and to indicate illumination of said other of said pair of lights with said second color if the line corresponding to said pair of lights has been placed on hold by a user of another conversion device or selected for connection to the receiver/speakerphone of the other user's conversion device.

4. The telephone conversion device of claim 1, wherein said control means further includes transfer means for addition to said hold-queue of said line identification for one of the multiple lines placed on hold by the user of another telephone conversion device in response to the user's operation of a corresponding one of said line selection switches and without said off-hook signal indicating the receiver/speakerphone is off-hook, whereby a line placed on hold by the other telephone user can be added to said hold-queue of the user and automatically selected from said hold-queue by said control means.

5. The telephone conversion device of claim 4, wherein said transfer means adds said line identification for the line placed on hold by the other telephone user in a first to be selected position of said hold-queue.

6. The telephone conversion device of claim 5, wherein said transfer means includes means, which if the other telephone user places the line on hold after the user's operation of said corresponding line selection switch and without said off-hook signal indicating the receiver/speakerphone is off-hook, for addition of said line identification for the line placed on hold by the other telephone user in said hold-queue upon the other user placing the line of hold after the user's operation of said corresponding line selection switch, whereby if a line is being transferred and the other telephone user does not place the line on hold until after the user has already operated said corresponding line selection switch, or if the line is placed on hold before the user has operated said corresponding line selection switch, upon said off-hook signal indicating the receiver/speakerphone is off-hook said control means will automatically select said line identification for the line, thus said control means will not be caused to select other ones of said stored line identifications or select an idle line when a line is being transferred as a result of the sequence in which the other user places the line on hold and the user operates said corresponding line selection switch.

7. The telephone conversion device of claim 1, wherein said control means further includes means for automatically removing said stored line identification of said selected lines from said hold-queue upon generating said connection control signal to cause said connection means to connect said selected line to said common line or upon the other user telephone user selecting the line for connection to the receiver/speakerphone of the other user's telephone conversion device.

8. The telephone conversion device of claim 7, wherein said control means further includes means for automatically removing said stored line identifications from said hold-queue for lines that have been disconnected from the telephone system.

9. The telephone conversion device of claim 1, wherein said control means includes means, which if the user has operated one of said line selection switches to indicate selection of one of the multiple lines without said off-hook signal indicating the receiver/speakerphone is off-hook, for generating said connection control signal upon said off-hook signal indicating the receiver/speakerphone is off-hook to indicate said selected line to said connection means for causing said connection means to connect said selected line to said common line, whereby if the user selects a line before the receiver/speakerphone is taken off-hook, when the receiver/speakerphone is taken off-hook said selected line will be connected to said common line without regard for any of said stored line identifications which may be in said hold-queue.

10. The telephone conversion device of claim 9, wherein said control means including means, which if the user has operated said same one of said line selection switches a second time without said off-hook signal indicating the receiver/speakerphone is off-hook, for inhibiting said connection control signal indicating said selected line to said connection means, whereby if the user operates said line selection switch for said selected line a second time before the receiver/speakerphone is taken off-hook, the selection of said selected line by the first operation of said line selected switch is cancelled.

11. The telephone conversion device of claim 9, wherein said control means includes means, which if the user has operated said same one of said line selection switches a second time with said off-hook signal indicating the receiver/speakerphone is off-hook, for disconnecting said selected line from said common line, whereby if the user operates said line selection switch for said selected line a second time after the receiver/speakerphone is taken off-hook, the connection of said selected line to said common line is terminated and the user may go on to the next line without first having to place the receiver/speakerphone on-hook or manually operate a disconnect switch and then another switch to select the next line.

12. The telephone conversion device of claim 11, wherein said control means, in response to the user operating said same one of said line selection switches said second time to disconnect said selected line from said common line, automatically selects the one of said stored line identifications from said hold-queue for the line that has been placed on hold the longest, and if no line identifications are in said hold-queue, automatically selects an idle line based upon said line status indicating signal.

13. The telephone conversion device of claim 3, wherein said control means includes means for generating said light control signal to indicate illumination of one of said pair of lights with said first color and for ceasing illumination with said second color responsive to the user's operation of a corresponding one of said line selection switches if the line corresponding to said pair of lights has been placed on hold by the user of another conversion device, said control means storing said line identification for the line in said hold-queue.

14. The telephone conversion device of claim 13, wherein said control means includes means for generating said light control signal to indicate continued illumination of one of said pair of lights with said first color responsive to the other telephone user adding the line identification of a line placed on hold by the user to the hold-queue of the other user's telephone conversion device.

15. The telephone conversion device of claim 14, wherein said control means includes means for generating said light control signal to indicate illumination of one of said pair of lights with said second color and for ceasing illumination with said first color responsive to the other telephone user selecting the line for connection to the receiver/speakerphone of the other user's telephone conversion device.

16. The telephone conversion device of claim 3, wherein said control means includes means for generating said light control signal to further indicate flashing illumination of one of said pair of lights with said first color if the line corresponding to said pair of lights has been placed on hold by the user or otherwise added to said hold-queue, and to further indicate flashing illumination of one of said pair of lights with said second color if the line corresponding to said pair of lights has been placed onhold by the other telephone user.

17. The telephone conversion device of claim 3, wherein said control means includes means for generating said light control signal to further indicate constant illumination of one of said pair of lights with said first color if the line corresponding to said pair of lights has been selected for connection to the receiver/speakerphone of the user, and to further indicate constant illumination of one of said pair of lights with said second color if the line corresponding to said pair of lights has been selected for connection to the receiver/speakerphone of the other telephone user.

18. A telephone conversion device for converting a multiple line electromechanical telephone system having an electromechanical key system unit for use with an electronic telephone, where the key system unit includes an outlet cable with an outlet connector at the user's telephone station, comprising:
   a first unit mountable adjacent to the outlet connector and a second unit positionable on the user's desk and connectable to the electronic telephone, said first and second units being electrically connected together by a slender interconnection electric cord;
   said first unit including:
   a connector mateable with the electromechanical system outlet connector;
   line status sensing means for determining the operational status of the multiple lines of the outlet cable by sensing the lamp driving signals provided by the key system unit on the outlet cable, and generating a line status indicating signal in response thereto;
   connection means for connecting a common line forming a part of said interconnection cord to a selected one of the multiple lines in response to a connection control signal;
   detector means for detecting when the receiver/speakerphone of the electronic telephone is off-hook, and generating an off-hook signal in response thereto;
   line status control means for generating a status control signal on the outlet cable indicating to the key system unit which of the multiple lines is to be active and which are to be placed on hold;
   first control means for generating said connection control signal to control the operation of said connection means and generating a light control signal, said first control means operating in response to said line status indicating signal, said off-hook signal and a switch operation signal;
   memory means for storage of line identifications in a hold-queue;
   said second unit including:
   a plurality of momentary contact line selection switches, one of said switches corresponding to each of the multiple lines and being operable by the user to indicate selection of the corresponding line;
   a hold switch operable by the user to indicate selection of the then active one of the multiple lines to place on hold;
   switch scanning means for sensing operation of any of said line selection switches or said hold switch, and generating said switch operation signal in response thereto;
   a plurality of line status indicating lights, with one of said lights corresponding to each of the multiple lines, selective ones of said lights being illuminable in response to said light control signal;
   means for electrically connecting said common line to the receiver/speakerphone of the electronic telephone with which the telephone conversion device is used; and
   second control means for receiving said light control signal from said first control means to control the illumination of said line status lights, and transmitting said switch operation signal to said first control means, said second control means operating in response to instructions from said first control means, wherein said line identifications stored in said memory means indicate which of the multiple lines have been selected by the user's operation of said hold switch and the sequential order of the lines placed on hold by the user, and said first control means, in response to said off-hook signal indicating the receiver/speakerphone is off-hook and said switch operation signal indicating none of said line selection switches have been operated to indicate selection of one of the multiple lines, automatically selecting the one of said stored lines, automatically selecting the one of said stored line identifications from said hold-queue for the line that has been placed on hold the longest, and if no line identifications are in said hold-queue automatically selecting an idle line based upon said line status indicating signal, and then generating said connection control signal indicating said selected line from said hold-queue or idle lines to said connection means to cause said connection means to connect said selected line to said common line, whereby the features of the electronic telephones are provided without replacing the existing key system unit or the associated cabling and without the need for a large cable extending between the outlet connector and the telephone on the user's desk, and whereby the user may be connected to the line which has been on hold the longest and if none to an idle line for calling out without first having to select a line by operation of one of said line selection switches, thus avoiding unintentional connection with a line put on hold by another user or an active line which is occupied by another user.

19. The telephone conversion device of claim 18, wherein if there are no line identifications in said hold-queue and there are no idle lines, said control means includes means for waiting and selecting the first active line becoming idle and then causing said connection means to connect said selected idle line to said common line, whereby even if all lines are active when the user picks up the receiver the device will automatically connect him to the first line to become idle.

20. The telephone conversion device of claim 18, wherein said control means further includes transfer means for addition to said hold-queue of said line identification for one of the multiple lines placed on hold by the user of another telephone conversion device in response to the user's operation of a corresponding one of said line selection switches and without said off-hook signal indicating the receiver/speakerphone is off-hook, whereby a line placed on hold by the other telephone user can be added to said hold-queue of the user and automatically selected from said hold-queue by said control means.

21. The telephone conversion device of claim 20, wherein said transfer means adds said line identification for the line placed on hold by the other telephone user in a first to be selected position of said hold-queue.

22. The telephone conversion device of claim 21, wherein aid transfer means includes means, which if the other telephone user places the line on hold after the user's operation of said corresponding line selection switch and without said off-hook signal indicating the receiver/speakerphone is off-hook, for addition of said line identification for the line placed on hold by the other telephone user in said hold-queue upon the other user placing the line of hold after the user's operation of said corresponding line selection switch, whereby if a line is being transferred and the other telephone user does not place the line on hold until after the user has already operated said corresponding line selection switch, or if the line is placed on hold before the user has operated said corresponding line selection switch, upon said off-hook signal indicating the receiver/speakerphone is off-hook said control means will automatically select said line identification for the line, thus said control means will not be caused to select other ones of said stored line identifications or select an idle line when a line is being transferred as a result of the sequence in which the other user places the line on hold and the user operates said corresponding line selection switch.

23. The telephone conversion device of claim 18, wherein said control means further includes means for automatically removing said stored line identification of said selected lines from said hold-queue upon generating said connection control signal to cause said connection means to connect said selected line to said common line or upon the other user telephone user selecting the line for connection to the receiver/speakerphone of the other user's telephone conversion device.

24. The telephone conversion device of claim 23, wherein said control means further includes means for automatically removing said stored line identifications from said hold-queue for lines that have been disconnected from the telephone system.

25. The telephone conversion device of claim 18, wherein said control means includes means, which if the user has operated one of said line selection switches to indicate selection of one of the multiple lines without said off-hook signal indicating the receiver/speakerphone is off-hook, for generating said connection control signal upon said off-hook signal indicating the receiver/speakerphone is off-hook to indicate said selected line to said connection means for causing said connection means to connect said selected line to said common line, whereby if the user selects a line before the receiver/speakerphone is taken off-hook, when the receiver/speakerphone is takne off-hook said selected line will be connected to said common line without regard for any of said stored line identifications which may be in said hold-queue.

26. The telephone conversion device of claim 25, wherein said control means including means, which if the user has operated said same one of said line selection switches a second time without said off-hook signal indicating the receiver/speakerphone is off-hook, for inhibiting said connection control signal indicating said selected line to said connection means, whereby if the user operates said line selection switch for said selected line a second time before the receiver/speakerphone is taken off-hook, the selection of said selected line by the first operation of said line selected switch is cancelled.

27. The telephone conversion device of clam 25, wherein aid control means includes means, which if the user has operated said same one of said line selection switches a second time with said off-hook signal indicating the receiver/speakerphone is off-hook, for disconnecting aid selected line from said common line, whereby if the user operates said line selection switch for said selected line a second time after the receiver/speakerphone is taken off-hook, the connection of said selected line to said common line is terminated and the user may go on to the next line without first having to place the receiver/speakerphone on-hook or manually operate a disconnect switch and then another switch to select the next line.

28. The telephone conversion device of claim 27, wherein said control means, in response to the user operating said same one of said line selection switches said second time to disconnect said selected line from said common line, automatically selects the one of said stored line identifications from said hold-queue for the line that has been placed on hold the longest, and if no line identifications are in said hold-queue, automatically selects an idle line based upon said line status indicating signal.

29. The telephone conversion device of claim 18, wherein each of said lights includes a pair of selectively illuminable lights, one of said pair of lights being a first color and the other of said pair of lights being a second color, and wherein said first control means includes means for generating said light control signal to indicate illumination of one of said pair of lights with said first color if the line corresponding to said pair of lights has been placed on hold by the user of the device or selected for connection to the receiver/speakerphone of the user, and to indicate illumination of said other of said pair of lights with said second color if the line corresponding to said pair of lights has been placed on hold by a user of another conversion device or selected for connection to the receiver/speakerphone of the other user's conversion device.

30. The telephone conversion device of claim 29, wherein said control means includes means for generating said light control signal to indicate illumination of one of said pair of lights with said first color and for ceasing illumination with said second color responsive to the user's operation of a corresponding one of said line selection switches if the line corresponding to said pair of lights has been placed on hold by the user of another conversion device, said control means storing said line identification for the line in said hold-queue.

31. The telephone conversion device of claim 30, wherein said control means includes means for generating said light control signal to indicate continued illumination of one of said pair of lights with said first color responsive to the other telephone user adding the line identification of a line placed on hold by the user to the hold-queue of the other user's telephone conversion device.

32. The telephone conversion device of claim 31, wherein said control means includes means for generating said light control signal to indicate illumination of one of said pair of lights with said second color and for ceasing illumination with said first color responsive to the other telephone user selecting the line for connection to the receiver/speakerphone of the other user's telephone conversion device.

33. The telephone conversion device of claim 29, wherein said control means includes means for generating said light control signal to further indicate flashing illumination of one of said pair of lights with aid first color if the line corresponding to said pair of lights has been placed on hold by the user or otherwise added to said hold-queue, and to further indicate flashing illumination of one of said pair of lights with said second color if the line corresponding to said pair of lights has been placed on hold by the other telephone user.

34. The telephone conversion device of claim 29, wherein said control means includes means for generating said light control signal to further indicate constant illumination of one of said pair of lights with said first color if the line corresponding to said pair of lights has been selected for connection to the receiver/speakerphone of the user, and to further indicate constant illumination of one of said pair of lights with said second color if the line corresponding to said pair of lights has been selected for connection to the receiver/speakerphone of the other telephone user.

* * * * *

UNITED STATES PATENT AND TRADEMARK OFFICE
CERTIFICATE OF CORRECTION

PATENT NO. : 4,726,058

DATED : February 16, 1988

INVENTOR(S) : Peter T. Skelly

It is certified that error appears in the above-identified patent and that said Letters Patent is hereby corrected as shown below:

Column 19, Line 3, delete the word "place" and substitute therefor --placed--.

Column 19, Line 35, delete the first occurence of the word "of" and substitute therefor --on--.

Column 19, Line 56, delete the first occurence of the word "user".

Column 22, Lines 33 and 34, delete the words "automatically selecting the one of said stored lines".

Column 23, Line 15, delete the word "aid" and substitute therefor --said--.

Column 23, Line 43, delete the first occurence of the word "user".

Column 23, Line 63, delete the word "takne" and substitute therefor --taken--.

Column 24, Line 10, delete the word "clam" and substitute therefor --claim--.

UNITED STATES PATENT AND TRADEMARK OFFICE
CERTIFICATE OF CORRECTION

PATENT NO. : 4,726,058

DATED : February 16, 1988

INVENTOR(S) : Peter T. Skelly

It is certified that error appears in the above-identified patent and that said Letters Patent is hereby corrected as shown below:

Column 24, Line 11, delete the word "aid" and substitute therefor --said--.

Column 24, Line 15, delete the word "aid" and substitute therefor --said--.

Column 25, Line 12, delete the word "aid" and substitute therefor --said--.

Signed and Sealed this

Sixth Day of September, 1988

Attest:

DONALD J. QUIGG

Attesting Officer

Commissioner of Patents and Trademarks